UNITED STATES PATENT OFFICE.

EDGAR L. WILLIAMS, OF LYNN, MASSACHUSETTS.

SOLDERING-FLUX.

1,359,010.

Specification of Letters Patent. Patented Nov. 16, 1920.

No Drawing. Application filed December 1, 1919. Serial No. 341,693.

*To all whom it may concern:*

Be it known that I, EDGAR L. WILLIAMS, a citizen of the United States, residing at Lynn, in the county of Essex and State of Massachusetts, have invented certain new and useful Improvements in Soldering-Fluxes, of which the following is a specification.

Among the objections to soldering fluxes as ordinarily employed are corrodibility of the metals at the joint and the tendency to leave a residuum of the component elements of which the flux is composed after the heated soldering iron or gas torch has been applied. This residuum renders it difficult to produce a clean soldered joint without subsequent dressing of the joint by some suitable abrasive means such as emery, with the result of weakening of the joint thus made. Fluxes commonly employed consist of rosin and an acid solvent of some kind such as boracic acid, which when dissolved prepares the metal in such a manner to dissolve the metallic oxids; leave a clean metal so that the solder comes in contact therewith, and prevent further oxidation by contact with the air at the high temperature at which the soldering operation is effected. On account of the possibility of the metal being attacked by the acid solvent it is necessary to wash off the finished joint with water or alcohol. Rosin itself will not dissolve metallic oxids, but will float off the greasy constituents. Rosin is employed quite commonly in fluxes used by tinsmiths and plumbers, but combined with gasolene as a cleanser. Gasolene, of course, in addition to its inflammable and consequently dangerous nature, is not a solvent for rosin and there is a residue of rosin left after the soldering operation has been performed.

The object of the present invention is to provide a flux which will obviate the above objections, which will leave no residue, and which will produce a clean and strong soldered joint without the necessity for subsequent dressing or washing off; and which will solder any joint by means of a soldering iron or gas torch without involving corrosion of the metal at the joint. I have found by experiment that a flux composed of substantially 100 parts of alcohol (denatured), 100 parts of rosin (preferably in the powdered form), and 25 parts of aromatic spirits of ammonia is an excellent flux and is especially applicable for fine work as for soldering of electrical instrument springs.

The function of the ammonia in my new soldering flux is that of a cleanser, cleansing the part to be soldered in preparation for the soldering operation, but, unlike the acid of the ordinary fluxes, will not attack the metal of the joint. The 25 parts of aromatic spirits of ammonia used in the flux has the composition as found in the *U. S. Pharmacopœia* and consists substantially of 70% alcohol and the balance largely ammonia. However, in lieu of the aromatic spirits, I can use 28% of plain ammonia.

In the case of the use of gasolene in the tinsmiths' or plumbers' flux, for example, the gasolene really disappears upon the application of a very low heat, whereas by the use of alcohol in my improved flux, while the alcohol will not vaporize as rapidly as gasolene, it will evaporate readily after it has been utilized sufficiently in performing its function as a solvent for the rosin, thus not only conferring safety from fire in its use, but also leaving no residue in the flux after the soldering iron or gas torch has been applied, and eliminating the necessity for subsequent washing off with water or alcohol in order to prevent corrosion, there being no acid used as is the case with the zinc chlorid-boracic acid and analogous combinations. The alcohol in excess of that used in dissolving the rosin is rapidly evaporated off at the temperature of soldering.

By putting a few drops of my improved flux in a suitable receptacle or on a suitable support, as on a piece of wood; by heating the iron, then rubbing the iron through the liquid and over the solder, the iron will be retinned without the need of filing.

The flux can be made into stick form by using the same proportions, but by adding tallow for the stick and petroleum for the paste, instead of the rosin and gasolene of the tinsmiths' flux, the latter involving danger of fire. When tallow is used, the tallow floats off dirt from the surface to be soldered.

The above flux, therefore, is especially adaptable for the soldering of delicate metal pieces such as electrical instrument springs, where the soldering paste runs around the spring.

What I claim and desire to secure by Letters Patent of the United States is:

1. A soldering flux comprising in combination alcohol, rosin and ammonia.

2. A soldering flux comprising in combination by volume 100 parts of denatured alcohol, 100 parts of pulverized rosin and 25 parts of aromatic spirits of ammonia.

3. A soldering flux comprising in combination by volume 100 parts of denatured alcohol, 100 parts powdered rosin and 28 parts plain ammonia.

In testimony whereof I have affixed my signature.

EDGAR L. WILLIAMS.